United States Patent
Balasubramanian et al.

(10) Patent No.: US 12,135,639 B2
(45) Date of Patent: *Nov. 5, 2024

(54) SYSTEMS AND METHODS FOR WORKFLOW BASED APPLICATION TESTING IN CLOUD COMPUTING ENVIRONMENTS

(71) Applicant: INTUIT INC., Mountain View, CA (US)

(72) Inventors: Saravanan Balasubramanian, Mountain View, CA (US); Navin Kumar Jammula, Mountain View, CA (US); Sumit Nagal, Mountain View, CA (US); Vijay Thomas, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/180,090

(22) Filed: Mar. 7, 2023

(65) Prior Publication Data

US 2023/0222052 A1 Jul. 13, 2023

Related U.S. Application Data

(63) Continuation of application No. 17/347,494, filed on Jun. 14, 2021, now Pat. No. 11,625,319.

(51) Int. Cl.
G06F 11/36 (2006.01)
G06F 8/41 (2018.01)
G06F 8/60 (2018.01)

(52) U.S. Cl.
CPC ............ *G06F 11/3688* (2013.01); *G06F 8/60* (2013.01); *G06F 11/3664* (2013.01); *G06F 11/3692* (2013.01); *G06F 8/41* (2013.01)

(58) Field of Classification Search
None
See application file for complete search history.

(56) References Cited

U.S. PATENT DOCUMENTS 8,229,974 B2 * 7/2012 Lowry ...................... G06F 8/20
707/803
10,691,514 B2 * 6/2020 McClory .......... G06Q 10/06398
(Continued)

FOREIGN PATENT DOCUMENTS

CN 111309573 A * 6/2020

OTHER PUBLICATIONS

Bauer, "Georedundancy Testing", 2012, IEEE (Year: 2012).*
(Continued)

*Primary Examiner* — Hossain M Morshed
(74) *Attorney, Agent, or Firm* — DLA Piper LLP US

(57) ABSTRACT

A testing system and method for testing application code against various failure scenarios. The testing system and method generate a test workflow including test source code implementing a series of actions that affect an application component and or an infrastructure component included in application code. The testing system and method execute the test workflow to determine the performance of the application code during one or more failure scenarios caused by the series of actions included in the test workflow. Performance data generated by the test code is analyzed by a performance analysis service or method to identify limitations of the application code and build resiliency patterns that address the limitations and improve the performance of the application code.

20 Claims, 5 Drawing Sheets

(56) References Cited

U.S. PATENT DOCUMENTS

| | | | | |
|---|---|---|---|---|
| 11,074,165 | B2* | 7/2021 | Khakare | G06F 8/61 |
| 11,625,319 | B2* | 4/2023 | Balasubramanian | G06F 11/3476 717/124 |
| 2006/0106585 | A1* | 5/2006 | Brown | G06F 8/20 703/1 |
| 2007/0299858 | A1* | 12/2007 | Norcott | G06F 16/211 707/999.102 |
| 2009/0007161 | A1* | 1/2009 | Sheehan | G06F 9/5005 719/331 |
| 2009/0007162 | A1* | 1/2009 | Sheehan | G06F 16/24 719/331 |
| 2014/0026122 | A1* | 1/2014 | Markande | G06F 11/3688 717/124 |
| 2015/0120791 | A1* | 4/2015 | Gummaraju | G06F 9/45558 707/823 |
| 2015/0331730 | A1* | 11/2015 | Agarwal | G06F 9/455 719/330 |
| 2017/0034023 | A1* | 2/2017 | Nickolov | H04L 43/0817 |
| 2017/0192805 | A1* | 7/2017 | Agarwal | G06F 9/4484 |
| 2018/0324204 | A1* | 11/2018 | McClory | G06F 9/5027 |
| 2019/0108116 | A1* | 4/2019 | Benes | G06F 21/552 |
| 2019/0317757 | A1* | 10/2019 | Jodoin | G06F 8/60 |
| 2020/0387357 | A1* | 12/2020 | Mathon | G06F 9/4411 |
| 2020/0394027 | A1* | 12/2020 | Ducore | G06F 8/437 |
| 2021/0019382 | A1* | 1/2021 | Huang | G06F 21/31 |
| 2021/0165689 | A1* | 6/2021 | Gauthier | G06F 9/5083 |
| 2021/0272003 | A1* | 9/2021 | Rigetti | G06N 10/20 |
| 2021/0303429 | A1* | 9/2021 | Malisic | G06F 12/0238 |
| 2022/0158926 | A1* | 5/2022 | Wennerstr?m | H04L 41/0853 |
| 2022/0191099 | A1* | 6/2022 | Pieczul | H04L 41/0893 |
| 2022/0222052 | A1* | 7/2022 | Watt | G06F 8/71 |
| 2022/0413999 | A1* | 12/2022 | Zhang | G06F 11/3688 |

OTHER PUBLICATIONS

Mendonca, "Model-Based Analysis of Microservice Resiliency Patterns", 2020, IEEE (Year: 2020).*

Smith, Correlate Chaos Engineering and system impact using Gremlin webhooks and NewRelic:, 2020, https://www.gremlin.com/community/tutorials/correlate-chaos-engineering-and-system-impact-using-gremlin-webhooks-and-new-relic) (Year: 2020).*

Faghri, "Failure Scenario as a Service (FSaaS) for Hadoop Clusters", 2012, ACM (Year: 2012).*

Kiciman, "Detecting Application-Level Failures in Component-Based Internet Services", 2005, IEEE (Year: 2005).*

Parsons, "Extracting Interactions in Component-Based Systems", 2008, IEEE (Year: 2008).*

Faghri, "Failure Scenario as a Service (FSaaS) for Hadoop Clusters", 2012, SDMCMM '12, Dec. 3-4, 2012, 6 pgs.

Bauer, "Georedundancy Testing", 2012 IEEE, 2012, pp. 243-255.

Mendonca, "Model-Based Analysis of Microservice Resiliency Patterns", 2020 IEEE International Conference on Software Architecture, 2020, pp. 114-124.

* cited by examiner

SYSTEMS AND METHODS FOR WORKFLOW BASED APPLICATION TESTING IN CLOUD COMPUTING ENVIRONMENTS

CROSS-REFERENCE TO RELATED APPLICATION

This application is a continuation of U.S. application Ser. No. 17/347,494, filed Jun. 14, 2021, entitled SYSTEMS AND METHODS FOR WORKFLOW BASED APPLICATION TESTING IN CLOUD COMPUTING ENVIRONMENTS. The content of which is incorporated herein by reference in its entirety.

BACKGROUND

In many cases, a software application may be deployed in cloud computing environments to expose functionality to users of the software application without needing to install a local copy. For larger software applications (i.e., software applications having a large number of users and or processing a large volume of data), the cloud computing environments are complex systems involving a range of interconnected support applications, data repositories, infrastructure components (e.g., operating systems, networks, services, platforms, and the like), and compute resources. To serve users of the software application, various aspects of the cloud computing environment may be modified to accommodate additional and or fewer instances of the software application. For example, at times of peak demand, additional virtual compute instances (e.g., containers, virtual machines, and the like) may be spun up within the cloud computing environment to host additional instances of the software application.

To evaluate the performance of applications deployed in cloud computing environments, various performance tests can be executed against the software applications in a testing environment. For accurate testing, it is important that the testing environment imitate the production environment under various conditions (e.g., heavy traffic periods, low traffic periods, and the like). For example, the components and resources of the cloud computing environment for testing should be similar to the components and resources of the cloud computing environment hosting production instances of the software application. It is also important that the experiments used to test the software applications include common failure scenarios that can test multiple aspects of the application code instead of failure scenarios that test one aspect of an application at a time. Currently, testing application code against failure scenarios that commonly occur in production environments is challenging because the tests require orchestrating multiple components of an application deployment on demand.

Additionally, current testing systems do not enable test code to dynamically change one or more resources available to application instances. Therefore, it is difficult to simulate failure scenarios involving rapid changes in resource availability of other conditions affecting the application code.

Accordingly, there is a need and desire to develop performance testing systems that can test multiple aspects of cloud computing environments under various conditions.

DETAILED DESCRIPTION OF SEVERAL EMBODIMENTS

Figure 1:
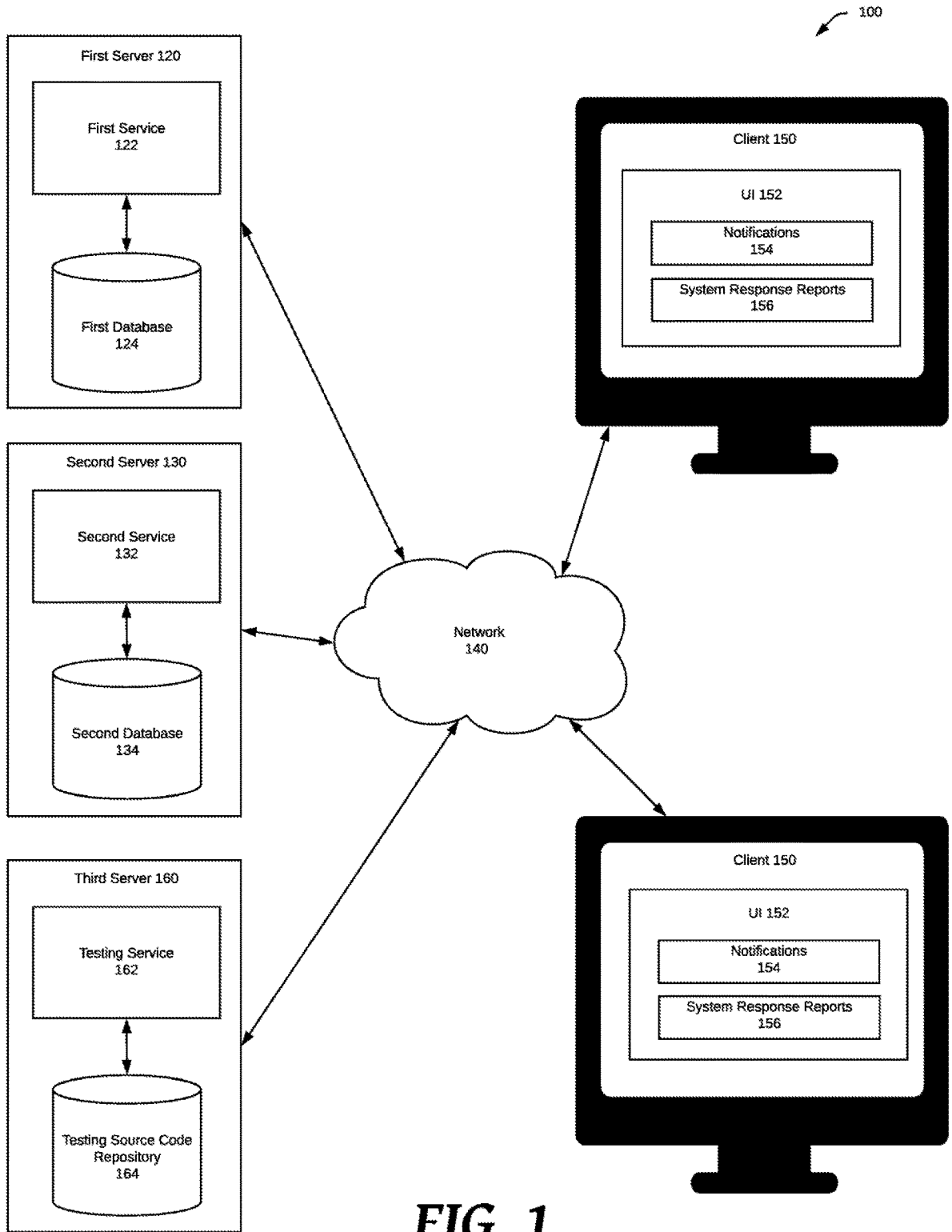
FIG. 1 illustrates an example system for testing software applications according to various embodiments of the present disclosure.

The disclosed technology provides a new software application testing system that evaluates the performance of application code under different failure scenarios. The testing system generates test workflows that target application components (e.g., databases, support applications, and the like) and or infrastructure components (e.g., services, platforms, compute resources, native services of compute resources, network resources, clouds, operating systems and the like) included in the application code. Instead of focusing on the high-level performance of the entire application, the test workflows test specific portions of application code against failure scenarios that are observed in production environments to identify limitations caused by the components of the application targeted by each test workflow. The testing system can also identify limitations related to interactions between multiple components of application code. Performance data generated during the tests is used to build resiliency patterns that address the limitations identified by the testing system. Applications may be updated to incorporate implementations of the resiliency patterns to improve the performance of the application during disruptions and/or failures.

The performance testing system generates testing environments that mimic production environments to ensure the actions performed by the test workflows simulate actual failure scenarios of production versions of software applications. The testing environments include component resources that are accessed by the application components and the infrastructure components of the application code. The test workflows may modify the component resources to perform actions that affect the application components and or infrastructure components. For example, test workflows that test the application code against network connection loss or another network failure may eliminate network component resources (e.g., kill a network server instance).

The interactions between the test workflows and the component resources may be automated by the testing system to provide automatic testing of application code. The test workflows may be automatically executed on application code according to a pre-determined event and or schedule (e.g., on the release date of every new and or updated application build). The automated testing performed by the testing system may ensure that the new and or updated application code achieves a baseline level of performance and or stability before it is released into production.

Thus, the disclosed technology provides a testing system that generates test workflows used to identify limitations related to specific components included in application code. The testing system tests application code on a granular level to identify specific problems (i.e., discrete problems related to a particular application component) and or complex problems (i.e., problems involving multiple application components) instead of focusing on high level performance of entire applications. The testing environments generated by the testing system replicate production environments to ensure the performance data generated during testing accurately reflects the response of the application code in production. The performance data generated by the testing system is analyzed to identify limitations within application code and develop resiliency patterns which reduce application failures, minimize system recovery time, and limit total application downtime. As a result, user satisfaction may be improved through improved application stability and system performance, increased resiliency, and lower operating costs. The increased user satisfaction should result in increased product engagement, positive customer ratings, and increased sales.

FIG. 1 illustrates an example application testing system 100 configured to execute test workflows that perform actions on multiple application components in accordance with the disclosed principles. System 100 may include a first server 120, second server 130, third server 160, and or one or more client devices 150. First server 120, second server 130, third server 160 and or client device(s) 150 may be configured to communicate with one another through network 140. For example, communication between the elements may be facilitated by one or more application programming interfaces (APIs). APIs of system 100 may be proprietary and/or may be examples available to those of ordinary skill in the art such as Amazon® Web Services (AWS) APIs or the like. Network 140 may be the Internet and/or other public or private networks or combinations thereof.

The third server 160 is configured to implement a testing service 162, which in one embodiment is used to generate test workflows and execute the test workflows on testing environments and other distributed computing environments. The distributed computing environments targeted by the testing service may be hosted by the first server 120, second server 130, and or third server 160. The testing service 162 may generate test workflows by compiling testing source code stored in a testing source code repository 164. The test workflows may include multiple tests targeting different components of application code deployed in the distributed computing environments.

The test workflows may be executed to perform actions on components of application code to test the application code against various failure scenarios. For example, the testing service 162 may execute a test workflow that targets applications, first database 124, and other application components of the first service 122 hosted by the first server 120. The testing service 162 may also execute a test workflow that targets applications, second database 134, and other application components and network services, domain name services, and other infrastructure components of the second service 132 hosted by the second server 130.

To track the progress of execution of the test workflows, the testing service 162 may distribute notifications 154 (e.g., push notifications, emails, text messages, and the like) that record initiated and completed tests and or log any errors during the execution of the test workflows. Performance data generated in response to the test workflows may be logged in system response reports 156 provided by the testing service 162. The system response reports may be analyzed by a performance analysis service to identify limitations and build resiliency patterns that increase availability and reliability the first service 122, second service 132, and or any other components of the applications hosted by the first server 120 and or second server 130. Users of the testing service 162 may receive the notifications 154 and or the system response reports 156 on one or more client device(s) 150.

Client device(s) 150 may be any device configured to receive notifications 154 and or system response reports 156 generated by the testing service 162. Exemplary client devices 150 may include a personal computer, laptop computer, tablet, smartphone, or other device. The testing service 162 distributes notifications 154 via network 140 to client device(s) 150. The client devices 150 provide a user interface (UI) 152 that displays the notifications 154 and or system response reports 156. The UI 152 receives input thereto to allow users to users to view and edit the notifications 154 and or system response reports 156.

First server 120, second server 130, third server 160, first database 124, second database 134, testing source code repository 164, and client device(s) 150 are each depicted as single devices for ease of illustration, but those of ordinary skill in the art will appreciate first server 120, second server 130, third server 160, first database 124, second database 134, testing source code repositories 164, and client device(s) 150 may be embodied in different forms for different implementations. For example, any or each of the first server 120, second server 130, and third server 160 can include a plurality of servers or one or more of the databases 124, 134, and testing source code repository 164. Alternatively, the operations performed by any or each of first server 120, second server 130, and third server 160 may be performed on fewer (e.g., one or two) servers. In another example, a plurality of client devices 150 communicate with first server 120, second server 130, and or third server 160. A single user may have multiple client devices 150, and or there may be multiple users each having their own client device(s) 150.

Figure 2:
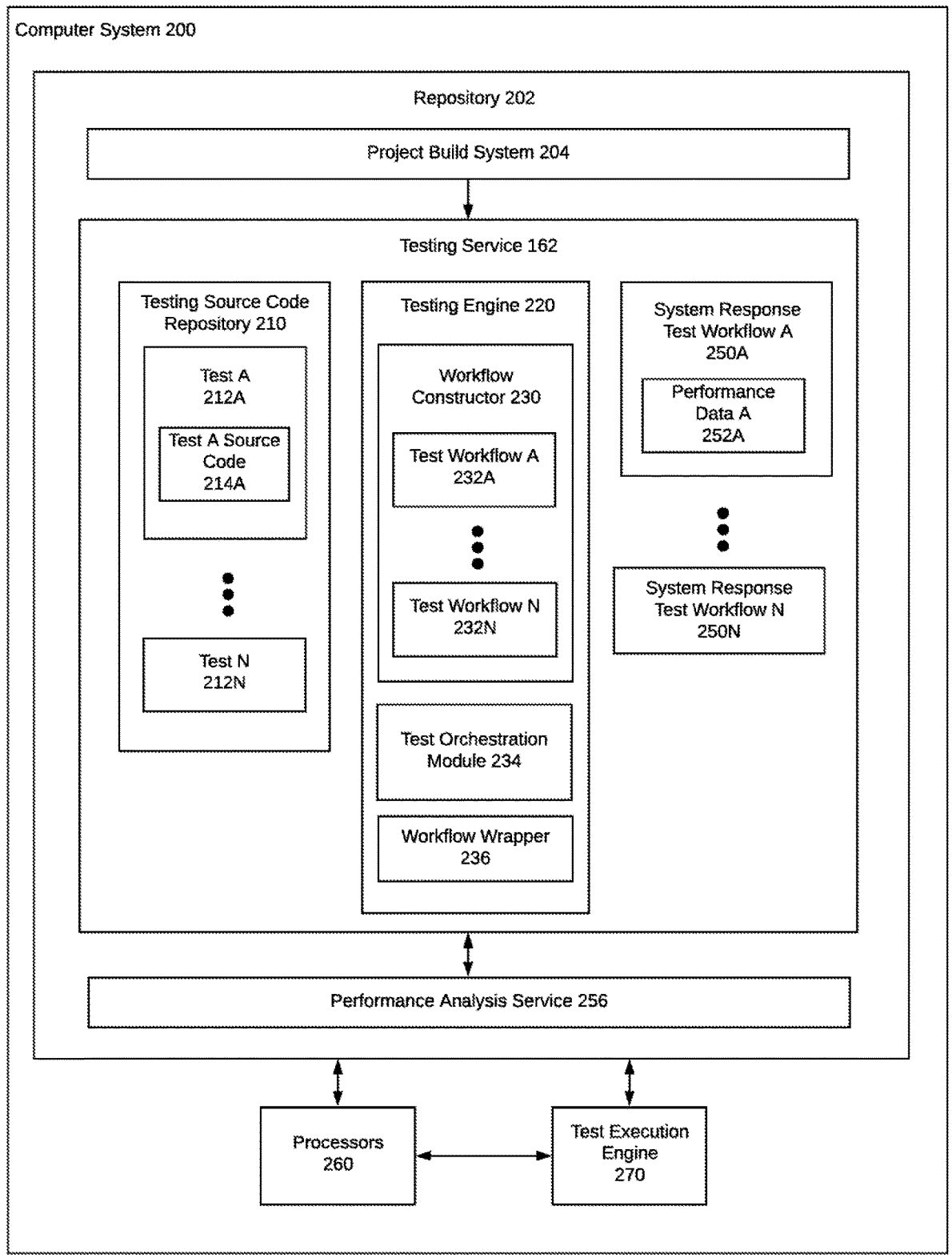
FIG. 2 shows more details of the example system shown in FIG. 1 according to various embodiments of the present disclosure.

FIG. 2 is a block diagram illustrating an example computer system 200 in accordance with one or more embodiments disclosed herein. The computer system 200 includes a repository 202, a test execution engine 270, and one or more computer processors 260. In one or more embodiments, the computer system 200 can take the form of the computing device 500 described in FIG. 5 and the accompanying description below or the form of the client device 150 described with respect to FIG. 1. In one or more embodiments, each computer processor 260 takes the form of the computer processor 502 described with respect to FIG. 5.

In one or more embodiments, the repository 202 may be any type of storage unit and or device (e.g., a file system, database, collection of tables, or any other storage mechanism) for storing data. Further, the repository 202 may include multiple different storage units and or devices. In one or more embodiments, the repository 202 includes a project build system 204, a testing service 162, and a performance analysis service 256.

The project build system 204 generates test compute environments used to test application code deployed on one or more compute instances (e.g., virtual machines, container instances included in the test compute environments. The test compute environments may include test code deployed to testing workflow instances (i.e., compute instances hosting test code). To generate application code, the project build system 204 compiles application source code from one or more application source code repositories. The application source code may include one or more application components (e.g., support applications, databases, and the like) that replicate the application components of application code deployed in production. The application code may also include infrastructure components (e.g., services, platforms, operating systems, network resources, native services, computer resources, and the like) that replicate the infrastructure components of application instances used in production environments. The application components and infrastructure components may interact with component resources to provide application functionality.

To generate test code, the project build system 204 complies testing source code selected by the testing engine 220. The testing engine 220 includes a workflow constructor 230 that generates test workflows 232A, ..., 232N that test the application code against a variety of failure scenarios. The workflow constructor 230 generates test workflows by selecting tests 212A, ..., 212N from a testing source code repository 210. The tests 212A, ..., 212N may include a series of actions implemented in testing source code. The series of actions included in the tests may be performed on one or more application components and or infrastructure components to test specific components against one or more failure scenarios. The workflow constructor 230 may combine multiple tests together and or multiple actions from different tests together in order to test different application components and or infrastructure components against particular failure scenarios. For example, the test workflows 232A, ..., 232N targeting specific infrastructure components can test against a service, platform, and or cloud level failure by killing a particular resource pod (e.g., unit of processing capacity and or storage) provisioned for a particular service (e.g., an orchestration service that distributes tasks to services included in an application, a monitoring service that tracks and the status of tasks assigned to services included in an application, and the like).

For example, the test workflows 232A, ..., 232N may target specific application components to test against an application level failure by varying the compute and or network resources provisioned for a particular application (e.g., killing an application instance, limiting network connectivity, changing the cloud computing platform hosting the application instance, and the like). The test workflows 232A, ..., 232N may interact with applications directly to perform application level tests (e.g., health checks that test the performance of the applications under various conditions including low traffic, high traffic, variable load with large fluctuations in the amount of traffic and the like). To perform an application level health check, the test workflows 232A, ..., 232N may submit a request to an application that requires the application to generate multiple messages (e.g., 200 or more messages). The test workflows 232A, ..., 232N may monitor the response of the application to the request (e.g., determine whether the messages generated by the application were OK or whether the application generated an error message, crashes, failed, and or threw an error) to determine the performance of the application. During testing, a curl call or other command line function may be used by the test workflows 232A, ..., 232N to submit the request, validate the application, and or otherwise interact with the application locally.

The test workflows 232A, ..., 232N may also perform service level tests and cloud level tests. To perform service level tests, the test workflows 232A, ..., 232N may interact with a particular service and or resource component used by the service. For example, test workflows 232A, ..., 232N can perform a service level test that determines whether a service is running on a particular port (e.g., port 80). To perform the service level test, the test workflows 232A, ..., 232N can submit a netstat call to an API or other component resource used by the service. The test workflows 232A, ..., 232N can listen for a response that indicates the service is running on a particular port (e.g., port 80 is open and listening for traffic) or the service is not responsive (e.g., port 80 is closed and or the service running on port 80 is not replying to traffic).

To perform cloud level tests, the test workflows 232A, ..., 232N may interact with a particular cloud computing system hosting the application and or a resource component provided by the cloud computing system that is used by the application. The test workflows 232A, ..., 232N may perform cloud level tests that evaluate an aspect (e.g., cloud type, availability, accessibility, performance, functionality, and the like) of the cloud computing system. For example, the test workflows 232A, ..., 232N may perform a cloud level test that determines if the application is hosted behind a particular configurable object (e.g., an object that controls access to the application hosted on the cloud computing system) and exposed via an endpoint. To perform the cloud level test, the test workflows 232A, ..., 232N may use a command line function (e.g., a curl call) to submit a request that directly hits the endpoint. The command line function may be submitted from a device having the network and access settings that match the configurable settings provided by the configurable object. The test workflows 232A, ..., 232N may determine that the application is hosted behind the configurable object and exposed via and endpoint if the application responds or otherwise interacts with the request send to the endpoint. The test workflows test workflows 232A, ..., 232N may identify a problem with one or more aspects the cloud computing system hosting the application if the application does not respond to the request.

The workflow constructor 230 can also combine multiple test workflows 232A, ..., 232N into an aggregate test workflow in order to test against failures at multiple levels of an application deployment. For example, a particular test workflow testing the application code against a service level failure may be combined with a test workflow testing the application code against an application level failure to test the application code against failure scenarios involving disruptions at the service level and at the application level of an application. Aggregate test workflows may also be used to validate particular limitations discovered based on performance data generated in response to particular test workflows 232A, ..., 232N. For example, an aggregate test workflow may perform an action that causes a service level failure on top of an existing application level failure. If the performance data indicates that introducing the service level failure on top of the application level failure does not further decrease performance, the application level limitation may be validated as the primary limitation impacting performance.

The illustrated testing engine 220 includes a test orchestration module 234, which may be used to execute test workflows. The test orchestration module 234 may include an API or other interface that connects with component resources accessed by application components and infrastructure components included in application code. The test orchestration module 234 orchestrates interactions between the application code and multiple component resources to perform the actions implemented in the test workflows. For example, the test orchestration module 234 may kill (i.e., terminate or shut down) a component resource used by an application component (e.g., kill a compute instance hosting a database available to the application code) to decrease the performance and or reduce the availability of the application component. The test orchestration module may also modify an infrastructure component resource (e.g., migrate the a pod providing compute resources to a service included in the application from GCP to AWS) used by an infrastructure component to perform an action effecting an the infrastructure component. The test orchestration module 234 may interface with multiple compute instances to execute tests against application code deployed on multiple application instances. For example, the test orchestration module 234 may deliver a request to terminate an application instance and deliver requests to the remaining application instances that simulate transactions performed in production.

The test orchestration module 234 automates interactions between application code and component resources and or application instances to enable the testing service 162 to automatically execute test workflows. To continuously test the application code against one or more failure scenarios, the test orchestration module 234 may automatically execute one or more of the test workflows 232A, . . . 232N based on a trigger. For example, the test orchestration module 234 may execute test workflows 232A, . . . 232N based on an annotation, check, webhook, or other message sent from an application in response to an event (e.g., a release of a new and or modified a piece of application code). The test orchestration module 234 may also execute test workflows 232A, . . . 232N based on a pre-defined schedule maintained by an automation server, orchestration service, and the like. For example, the orchestration module 234 may execute test workflows 232A, . . . 232N every 24 hours, every Wednesday, or at any other scheduled time.

The testing engine 220 also includes a workflow wrapper 236 that can convert the test workflows 232A, . . . , 232N generated by the workflow constructor 230 into an extensible format that may be deployed to a compute instance and or orchestration platform. For example, the workflow wrapper 236 may convert testing source code into an extensible format by wrapping the application source code included in the test workflows 232A, . . . , 232N in a markup language (e.g., YAML, JSON, XML, and the like). The extensible format of the test workflows 232A, . . . , 232N generated by the workflow wrapper 236 may be read by a compute instance (e.g., a testing instances or other virtual machine executing the test workflows 232A, . . . , 232N) and or an orchestration platform (e.g., Jenkins, Kubernetes, and the like). The workflow wrapper 236 may covert the testing source code into an extensible format to facilitate execution of the test workflows 232A, . . . , 232N on compute instances having different configurations. For example, the extensible format for the test workflows 232A, . . . , 232N may be used to deploy the test workflows to 232A, . . . , 232N to virtual machines having different resources (i.e., different amounts of processing capacity and or storage) and or virtual machines hosted on different clouds (e.g., Azure, GCP, AWS, and the like). The extensible format for the test workflows 232A, . . . , 232N may also make the test workflows 232A, . . . , 232N compatible with a variety of different orchestration platforms and other services (e.g., monitoring services, automation pipelines, and the like) that may facilitate execution of the test workflows 232A, . . . , 232N.

The testing engine 220 executes the test workflows 232A, . . . , 232N to perform tests against application components and infrastructure components included in application code. The testing engine 220 monitors the application code during the tests to record performance data in response to the test workflows 232A, . . . , 232N. For example, the testing engine 220 may record performance data including any crashes, failures, and or changes in performance (e.g., execution time, amount of transactions processed by second, or other speed metric, amount of memory used or other metric used to determine memory requirements, and the like). The performance data recorded by the testing engine 220 may also include changes in the availability and or stability of an application, recovery times in response to failures, total application downtime during one or more failure scenarios memory requirements, and the like.

The testing engine 220 records performance data for all application instances hosting a particular version of application code. The performance data for all application instances hosting the same application code may be recorded in a system response report generated by the testing engine. The performance data and or system response reports generated by the testing engine 220 may be transmitted by the testing service 162 to the performance analysis service 256 in order to identify limitations of the application code (e.g., limitations affecting an application performance, and application stability, or a recovery of an application after a crash). The performance analysis service 256 may use the performance data, limitations, and or system response reports to develop resiliency patterns used to improve the performance of the application code during different failure scenarios.

For example, the performance analysis 256 service may use performance data collected during performance tests to identify limitations that cause system failure and or latency. Performance tests executed by the test workflows 232A, . . . , 232N are stateful tests which run over a period of time during experiments. If one interruption happens on pod, node, or application instance the performance data will include a failure message detailing the interruption. The performance analysis service 256 may review the failure messages included in the performance data to identify the interruptions impacting the performance of the application and or the causes of the interruptions. To make the application more resilient, the build of the application can be updated to handle the interruptions by, for example, rerouting calls to available instances (e.g., instances that are not in a fail state). Accordingly, the performance analysis service 256 uses the performance data to identify opportunities to increase application resiliency.

The performance analysis service 256 may also identify opportunities to reduce latency. For example, the test workflows 232A, . . . , 232N may execute performance tests that simulate peak traffic conditions were the system is running low on application instances. The performance data may measure the amount of time required for new instances to come up and support the existing instances under these conditions. The performance analysis service 256 may review the amount of time required to bring the application back to the same state under peak traffic conditions to identify limitations that increase latency and or the causes of the limitations. To reduce the latency of the application during peak traffic conditions, the build of the application can be updated to reduce the amount of time required to spin up and configure new instances. Updating the build to reduce latency may also make the application more resilient by ensuring the application can handle fluctuations in the amount the traffic without interruptions or periods of poor performance. The performance analysis service 256 may continuously monitor the performance data of the application under a wide variety of conditions to enable the application build to be rapidly modified to handle the limitations identified by the performance analysis service 256.

Figure 3:
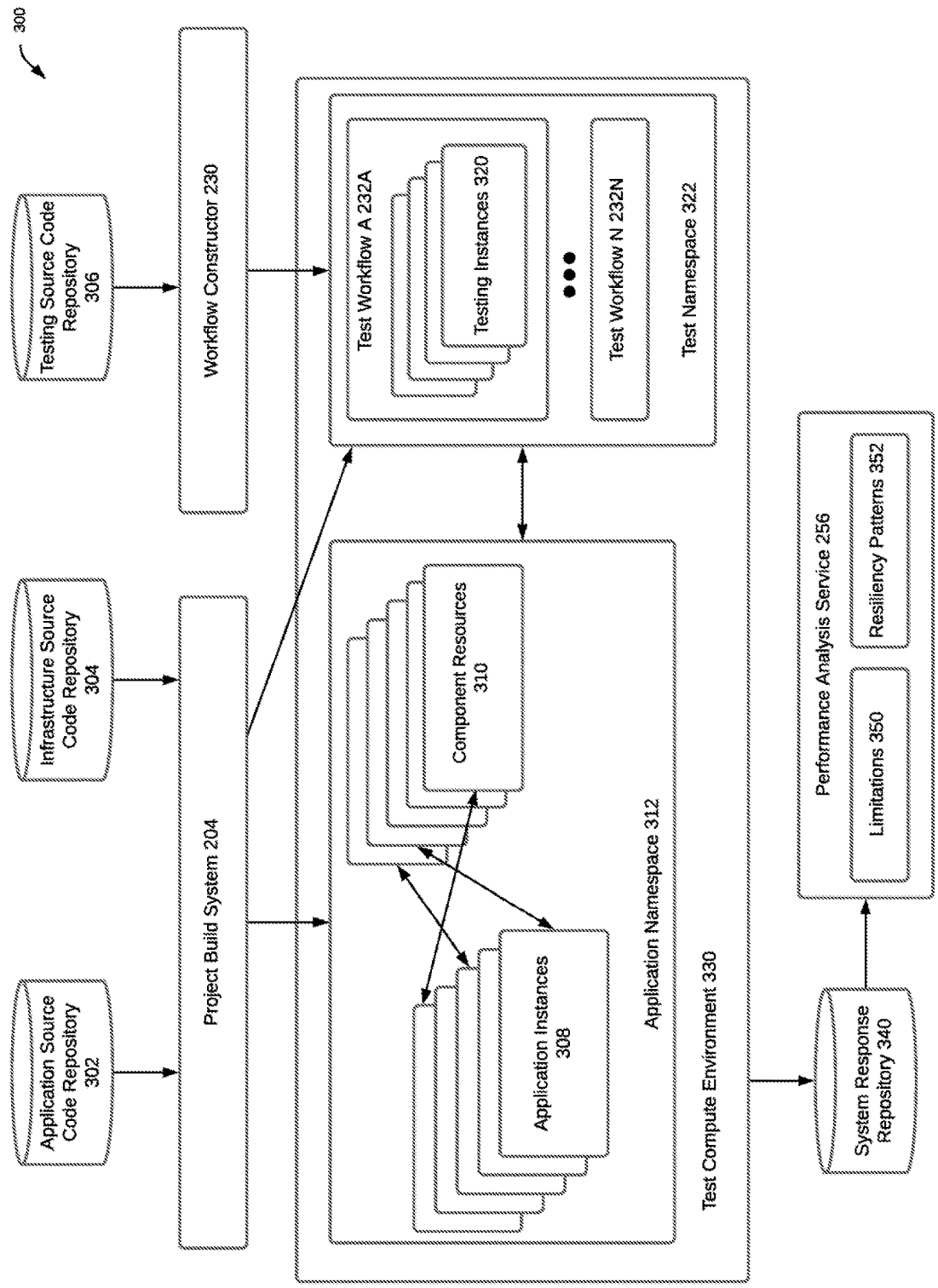
FIG. 3 shows an example computing environment for testing multiple aspects of application code according to various embodiments of the present disclosure.

FIG. 3 illustrates an example computing environment 300 for performing chaos tests and other performance tests against application components and or infrastructure components of a piece of application code. Chaos testing tests application code against various failure scenarios in order to determine the application code's ability to withstand turbulent conditions in production. For example, chaos tests may test application code against network failures, storage failures, usage spikes and surges, software malfunctions, third party provide outages, configuration errors, developer errors, loss of electrical power, and other failure scenarios that occur in production environments. The computing environment 300 includes an application source code repository 302, infrastructure source code repository 304, testing source code repository 164, project build system 204, test compute environment 330, system response repository 340, and performance analysis service 256.

To test application code, the project build system 204 uses code from each of the application source code repository 302, infrastructure source code repository 304, and testing source code repository 164 to compile one or more instances of the application code and the testing code and deploys the compiled instances to the test compute environment 330 for execution. To deploy application code for testing, the project build system 204 retrieves the application code from the application source code repository 302 and compiles the application code into one or more executable files. The complied application code may be deployed to one or more application instances 308 for execution.

To replicate production environments and support chaos testing, the application code includes application components and infrastructure components that may cause the application instances 308 to discover and interact with one or more component resources 310 specified by the infrastructure source code repository 304. For example, the component resources 310 may include databases, operating systems, platforms, services, clouds, compute resources, applications and other resources that are leveraged by the application code deployed on the application instances 308. The component resources 310 may also define the network resources, compute resources, and native services (e.g., monitoring service, domain name system or other service discovery system, and the like) required by the application code. Chaos testing may target multiple application components and or infrastructure components to test the application code against various failure scenarios. For example, test workflows that provide for chaos scenarios may include one or more actions that affect at least one of the application components, the infrastructure components, and or the component resources 310 required by the infrastructure components and or the application components.

The project build system 204 can generate a test compute environment 330 for performing tests against the application code. The illustrated test compute environment 330 includes an application namespace 312 in which one or more executable files execute. Generally, the application namespace 312 represents a set of virtual compute instances and or other set of resources accessible using the same name by test code executing in a test namespace 332 to test the application code. The project build system 204 may deploy the compiled application code into one or more application instances 308, which represent discrete virtual compute instances on which the compiled application code executes. The application instances 308 discover and interact with component resources 310 based on various conditions that may be provided by the test code. For example, the test code may perform a series of actions to test the application code under various conditions (e.g., high traffic, low traffic, different platforms, different databases, different connected applications, different network settings, different platform services, different cloud providers, and the like) and or against various failure scenarios. For example, the test code may change one or more aspects of the component resources 310 used by the application code deployed on the application instances. In response to the actions performed by the test code, the application instances 308 to interact with different component resources 310 and or change the number and or type of interactions between the application instances 308 and the component resources 310. The interactions between the application instances 308 and the component resources 310 may be tracked and recorded to evaluate the performance of the application code under the various conditions and or against various failure scenarios.

The component resources 310 may include any resources required by the application code to produce a load or other result. For example, the component resources 310 may include compute resources (e.g., virtual machines, container instances, and other compute units having an amount of processing power and an amount of memory). The component resources 310 may also be a specific type of compute resource. For example, the component resources may specify a particular configuration (e.g., number of processors or processing cores, types of processors or processing cores, amount of system memory, etc.) of the compute resources used by the application code. The component resources 310 may also include databases, operating systems, platforms, services, clouds, applications, network resources, native services for compute resources, and other resources that are leveraged by the application code.

The type and or configuration of each of the component resources 310 may be specified and or modified by actions performed by test code included in the test workflows 232A, . . . , 232N. For example, the test code may specify that the cloud component resources 310 be from a particular cloud provider (e.g., Azure, GCP, AWS, and the like). The test code may also define the platforms, services, databases, applications, and other component resources 310 available to the application code and the amount of traffic the application instances 308 may route to each of the component resources 310. The test code may also define the amount of each component resource 310 available to the application instances 308 (i.e., the number of resource pods available for a particular component resource 310). For example, the test code may reduce the amount of network resources available to the application instances 308 to test application code against a failure scenario involving a terminated network connection. The test code may also reduce the amount of application instances 308 and or the amount and or capacity of the resources included in the application instances 308 to test the application code in peak traffic conditions and or against failure scenarios involving a killed and or malfunctioning application instance.

The application instances 308 are setup using configuration information that defines a baseline performance (e.g., a number of floating point operations per second (FLOPS) that the virtual compute instances in the production environment are capable of performing). Project build system 204 can request that a deployment manager in test compute environment 330 generate virtual compute instances for application instances 308 according to the configuration information, which may guarantee that the application code is being tested on the same or similar system configurations and that the recorded performance of the compiled application code in application instances 308 is similar to that which would be experienced in a production environment.

The number of application instances 308 instantiated by project build system 204 also may be commensurate with a number of virtual compute instances on which the compiled application code would be deployed in a production environment. Project build system 204 can instantiate the application instances 308 based on a configuration of the virtual machines on which the compiled application code would be deployed in a production environment so that the compiled application code is tested on virtual compute instances with the same or similar computing resources (e.g., processor power, memory, memory latency, etc.) as in a production environment.

To test the application source code in application namespace 312, workflow constructor 230 assembles test workflows 232A, . . . , 232N that incorporate a series of actions performed on one or more application components and of infrastructure components included in application code. The project build system 204 can use the infrastructure source code in infrastructure source code repository 304 to generate and instantiate test namespace 322. Test namespace 322 generally represents a set of virtual compute instances (i.e., testing instances 320) accessible using the same name that is used to test application code deployed to the application instances 308 in application namespace 312. Generally, the infrastructure source code in the infrastructure source code repository 304 includes code for establishing a namespace associated with the testing instances 320 such that any of the testing instances 320 in test namespace 322 can generate and send transaction requests and commands (e.g., requests to orchestrate application instances 308 and or modify component resources 310) to application namespace 312 for execution. After the project build system 204 builds and deploys testing namespace 322, the test code included in the test workflows 232A, . . . , 232N can be compiled and deployed in one or more testing instances 320 in the test namespace 322.

To generate the testing instances 320, the project build system 204 can use information about an expected number of transactions to be executed over a given time period by the application source code and a number of transactions that a virtual compute instance can generate in order to determine the number and configuration of virtual compute instances to generate for testing instances 320. The project build system 204 may also modify the number of testing instances 320 and or the configurations of particular testing instances according to the test code to perform chaos testing. For example, test workflows 232A, . . . , 232N that include actions generating high traffic conditions and or restricting the amount of compute resources available to application instances 308 may cause the project build system 204 to generate additional testing instances 320 and or provision more compute resources to previously generated testing instances to support additional request traffic. The project build system 204 can also select the number and configuration of the virtual compute instances for the testing instances 320 according to a resource minimization strategy.

For example, if the test compute environment 330 allows for the generation of virtual compute instances that support X transactions per second (TPS), Y TPS, and Z TPS, where X=3*Y and Y=3*Z, and the application source code is expected to process 2Y+Z TPS, project build system 204 can determine that the test can be performed using one virtual compute instance supporting X TPS or two virtual compute instances supporting Y TPS and one virtual compute instance supporting Z TPS. A resource minimization strategy that is configured to minimize the number of virtual compute instances generated within testing namespace 322 may thus result in project build system 204 instantiating a single virtual compute instance supporting X TPS for the test. A resource minimization strategy that is configured, however, to minimize a total cost of performing a test may result in project build system 204 instantiating two virtual compute instances supporting Y TPS and one virtual compute instance supporting Z TPS, if the total cost is less than the total cost of executing the test using the single virtual compute instance supporting X TPS.

A plurality of virtual compute instances may be organized into a resource pod in test compute environment 330. Each resource pod may be associated with a maximum load (e.g., a maximum number of transaction requests per second) that can be generated against application instances 308 in application namespace 312. A number of resource pods may be instantiated by the project build system 204 to execute the test code based on the maximum load associated with each resource pod available in test compute environment 330 and an identified load to be generated in testing the application source code executing in application instances 308. In some aspects, the maximum load may be defined in terms of a number of read requests and a number of write requests to be executed against virtual compute instances in the target namespace 312 over a given period of time (e.g., a number of read requests to process per second and a number of write requests to process per second).

Generally, project build system 204 may allow for any number of virtual compute instances in test compute environment 330 to be instantiated in order to test compiled application code. Because the number of testing instances 320 and the configuration of the testing instances 320 generated by the project build system 204 may be dynamically defined according to the traffic profile of the application source code being tested, an appropriate amount of compute resources may be allocated for testing the application source code. Excess resources that may not be needed for testing application source code within test compute environment 330 thus may be allocated for other uses, such as concurrent testing of other application source code in a different application namespace. Because only the appropriate amount of compute resources are allocated for testing the application source code, aspects of the present disclosure may improve resource availability within the test compute environment 330, which may allow for additional compute resources to be used to improve or maintain the performance of other applications executing within test compute environment 330 or allow for additional applications to be tested and deployed within test compute environment 330.

After the virtual compute instances for testing workflow instances 308 are instantiated, the project build system 204 can deploy the complied test code included in test workflows 232A, . . . , 232N to testing instances 320 for execution. The same test code may be deployed to testing instances 320; however, different test code may also be deployed to testing instances 320 based on the compute resources allocated to each of the individual testing workflow instances. Once the compiled test code is deployed to the testing instances 320, testing may commence against the application source code deployed in the application instances 308.

For example, test workflows 232A, . . . , 232N executing on the testing instances 320 may perform actions targeting application components and or infrastructure components included in the application code. The actions may test the application code against various failure scenarios in order to identify the limits of the of application code under various unexpected scenarios, such as simulated traffic overload scenarios, unexpected system failure, or the like. The test workflows 232A, . . . , 232N may include a series of tests and or actions that expose multiple application components and or infrastructure components. For example, test workflows 232A, . . . , 232N may simulate a cascading failure of multiple, interrelated application components.

To execute test workflows 232A, . . . , 232N against application code, project build system 204 may be configured to generate virtual compute instances in the application namespace 312 and test namespace 322 corresponding to a typical real-world load on the application code under test. The test workflows 232A, . . . , 232N may simulate various failure or other chaos scenarios against the application code by performing actions that affect application components (e.g., support applications, databases, microservices, and the like) and infrastructure components (e.g., services, platforms, compute resources, native services of compute resources, network resources, clouds, and the like) of the application code. To affect the application components and or infrastructure components, the test workflows 232A, . . . , 232N may perform actions that modify the component resources 310 required by the application components and infrastructure components.

The test workflows 232A, . . . , 232N may also perform actions that affect the application instances 308 and or the testing instances 320. For example, to simulate a sudden increase in traffic, the test workflows 232A, . . . , 232N can instantiate additional testing workflow instances 320 in which test code can execute and generate additional traffic to be processed by application instances 308. In another example, to simulate a failure of one or more application components (e.g., services, microservices, platforms, compute resources, etc.), the test workflows can perform an action that eliminates access to the component resource 310 that provides the unavailable application component. Other failures and or system modifications can also be injected into application namespace 312 by test workflows 232A, . . . , 232N to execute a chaos tests against application code (e.g., changes in clouds, modifications in network resources, and the like). Chaos testing using use test workflows 232A, . . . , 232N may allow for automation and self-service of chaos testing, which may allow for efficient execution of chaos tests in the test compute environment 330 while avoiding or minimizing negative impacts on a production system.

As tests are executed against application code deployed in application instances 308, the test code executing in testing instances 320 can collect performance data for the test. The performance data may include any metric that measures the performance of the application code during a failure scenario. For example, the performance data may include timing information tracking the amount of time elapsed between transmission of a transaction request to target namespace 312 and receipt of a response from one of the application instances 308. The test code may include a threshold or benchmark time between transmission of a transaction request and receipt of a response from an application instance 308. If the measured time is less than the threshold or benchmark time, the test code can mark the transaction request as having been successfully processed; otherwise, the test code can mark the transaction request as having failed.

The performance data may also include a pre-defined response, expected payload, or other output generated by the application code in response to requests received from the test code. For example, the test code may specify a correct response for each transaction generated and transmitted to application instances 308 for execution. If the response from at least one of the application instances 308 matches the specified correct response, the test code can mark the response as correct and determine that the transaction request was successfully processed. If the response from at least one of the application instances 308 does not match the specified correct response, the test code can mark the response as incorrect and determine that the application code failed to process the transaction request. The performance data may also include any crashes, errors, and other exceptions generated by the application code in response to actions performed by the test code. The performance data may also include the recovery time (i.e., amount of time application took the application to become available after a crash) and application downtime (total time the application was unavailable) observed as a result of a crash caused by the test code.

A test executed within test namespace 322 may have a defined termination condition (e.g., based on a total number of transaction requests generated, a total amount of time, a threshold number of failed responses, etc.). When the defined termination condition is satisfied, the test code terminates testing and generates a system response report summarizing the results of the tests executed against all of the application instances 308 in application namespace 312 hosting the same application code. The system response report generated by the test code in any given testing workflow instance may include the performance data and any other information identifying a number of transaction requests transmitted to application namespace 312, information about the number or proportion of transaction requests that were successfully executed, timing information, correctness information, and the like. The system response report may further include information about each of the transaction requests transmitted to application namespace 312, which developers of the application code can use in debugging the application source code. The system response report may be stored in a system response repository 340. The performance analysis service 256 accesses the system response reports stored in the system response repository in order to identify limitations 350 of the application source code. The limitations 350 can be used to determine whether the application source code being tested is ready for deployment in a production environment. The system response reports may also be used to build resiliency patterns 352 that may be implemented to help the application resolve the limitations 350 and increase performance during failure scenarios.

One of the one or more testing instances 320 may be designated as a lead testing instance. The lead testing instance may track the total number of transaction requests generated in by the complied application source code included in the test workflows 232A, . . . , 232N and may issue a termination command to the other testing instances 320 when a test termination condition is satisfied.

The test code included in the test workflow deployed to the lead container instance may be configured to generate consolidated performance data based on the performance data generated by the test code executing in each of the plurality of testing instances. To generate the consolidated performance data, the test code in the lead container instance can retrieve the performance data generated by each of the plurality of testing instances 320. The retrieved performance may be consolidated into a single performance datapoint by merging (e.g., adding, averaging, etc.) the retrieved performance data. For example, consolidated performance data may include the total number of transaction requests generated by the testing instances 320, an average response time over all of the transaction requests, a total number or percentage of successfully processed transaction requests across all of the testing instances 320, and so on. The consolidated performance data may be recorded in a system response report stored in the system response repository 340 for further use, such as performance trend analysis, determining whether to promote application source code from a development environment to a production environment, and so on.

The performance analysis service 256 can also use the performance data and or consolidated performance data to determine whether the application code under test meets the defined performance requirements for the application code. The defined performance requirements for the application code may be defined, for example, as a threshold average response time, threshold response correctness level, or the like. If the performance data indicates that the application performs as expected, the performance analysis service 256 can deploy the application source code from the application source code repository 302 to a production environment hosted in the test compute environment 330 or other distributed compute environment (not shown). To deploy the application source code, the performance analysis service 256 can, in some aspects, instruct the project build system 204 to compile the application source code and deploy the compiled application source code to one or more virtual compute instances associated with the production environment in the test compute environment 330.

Figure 4:
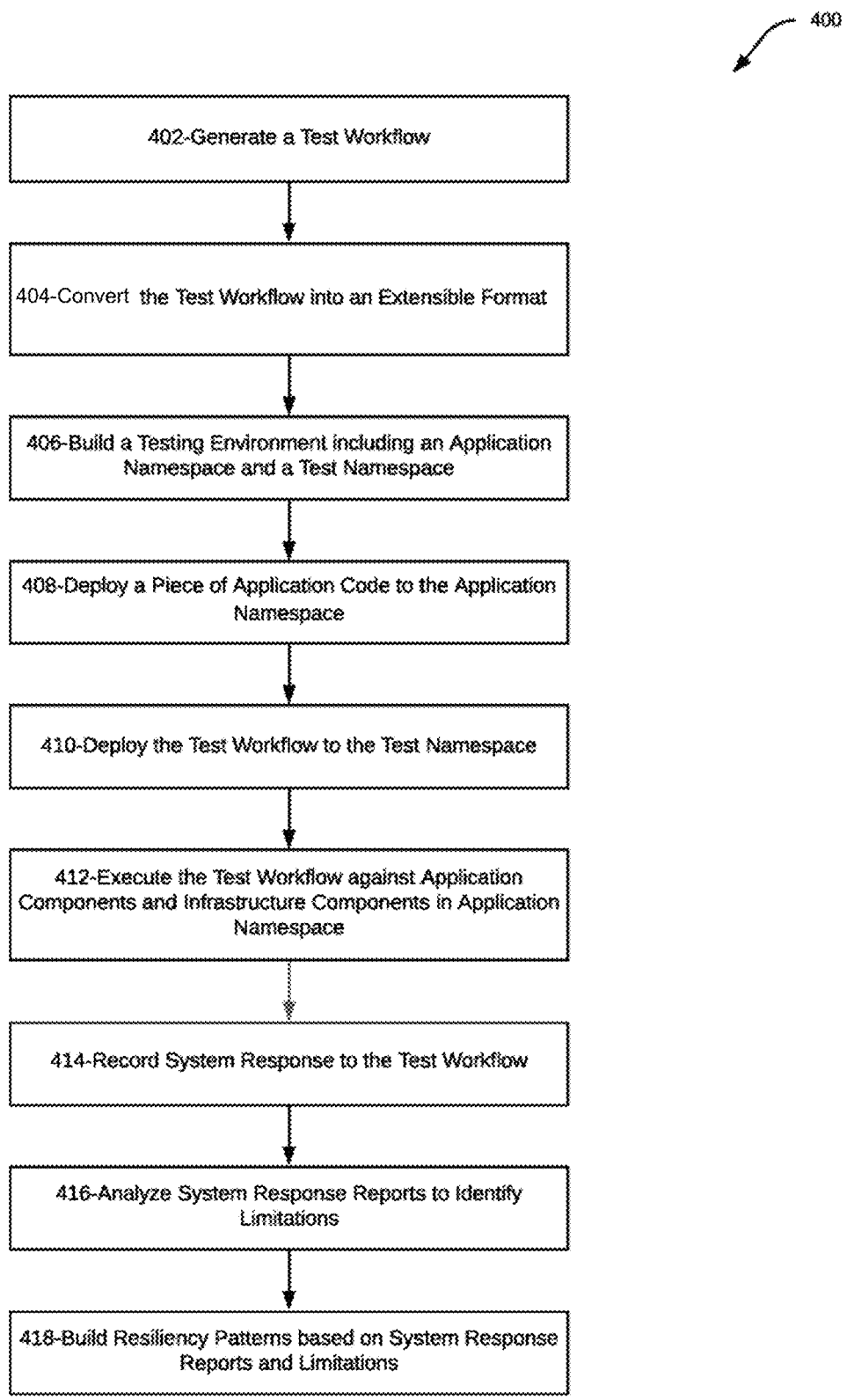
FIG. 4 is a flow diagram illustrating an example process for testing multiple aspects of application code according to various embodiments of the present disclosure.

FIG. 4 illustrates an example process 400 for performing tests against services in a computing environment in accordance with the disclosed principles. At step 402, the workflow constructor generates a test workflow by selecting one or more tests from a testing source code repository. The tests may include test source code that provides for one or more actions that are performed against application source code and or component resources. The one or more actions may affect one or more application components and or one or more infrastructure components included in the application source code. The actions may also include a request that causes the application code to generate a load or other response.

The testing source code repository includes a plurality of tests targeting different aspects of the application code. The workflow constructor may incorporate multiple tests and or multiple actions included in one or more tests to generate test workflows that test specific application components and or infrastructure components of the test code against different failure scenarios. For example, the tests that include actions terminating one or more database instances and or restricting access of the application code to support application instances may be used to test the application code against the failure of one or more application components. Tests that include actions reducing the amount of compute resources and or terminating one or more network connections may be used to test the application code against the failure of one or more infrastructure components.

To execute the test workflows generated by the workflow constructor, the test workflows are formatted for deployment to a test compute environment for execution. At step 404, the test workflow is converted into an extensible format by the workflow wrapper. For example, the workflow wrapper may convert the test source code included in the test workflow into the extensible format by wrapping the test workflow with a markup language (e.g., YAML, JSON, XML, and the like) or other extensible structured data format that may be deployed to a compute instance and or an read by orchestration service, automation server, or other platform used to execute the test workflows.

At step 406, the project build system builds a test compute environment to test the application code against the one or more tests included in the test workflow. The test compute environment includes an application namespace including one or more compute instances that execute application code (i.e., application instances). The application namespace may also include one or more component resources (e.g., applications, platforms, services, databases, compute resources, network resources, operating systems, clouds, and the like) that are accessed by the application components and the infrastructure components included in the application code. The test compute environment also includes a test namespace including one or more compute instances that execute test code included in test workflows (i.e., testing instances). To begin testing, at step 408, a piece of application code is deployed to one or more of the application instances in the application namespace. At step 410, a piece of test code included in the test workflow is deployed to one or more of the testing instances in the test namespace.

At step 412, the testing instances execute the test code included in the test workflow against the piece of application code deployed on the application instances. To execute the test code, the test instances may perform one or more actions that affect the application components and or the infrastructure components included in the application code. For example, the test instances may modify one or more of the component resources and or increase or decrease the number of component resources available to the application code. The test code may also cause the test instances to request a load or other response from the application code.

At step 414, the test instances record the response of the application code to the actions and or requests included in the test code. The response may include performance data that may be used to evaluate the performance of the application code under certain conditions and or during various failure scenarios. The performance data may include, for example, records of crashes, errors, and other exceptions, timing data including response time, recovery time, and the like, and other performance metrics including memory usage, total transactions processed, correct responses generated, and the like. The test instances may consolidate the performance data recorded during a test workflow into a system response report. The performance data and system response reports generated by the test instances may be stored in the system response repository.

The performance analysis service uses the performance data and or the system response reports to determine the performance of the application code during a failure scenario or other test implemented in the test workflow. At step 416, the performance analysis service analyzes the performance data and or system response reports to identify limitations in the performance of the application code. For example, the limitations may include vulnerabilities in the application code that cause the application code to crash, thrown an error, and or perform poorly (i.e., process transactions slowly, consume a large amount of compute resources per transaction, and the like) under certain conditions. The limitations may also include vulnerabilities in the application code that affect the ability of the application code to recover after a crash or other exception. For example, limitations that cause the application code to recover slowly after a crash or prevent the application from replicating its pre-crash performance. At step 418, the performance analysis service may build resiliency patterns that address the limitations (e.g., improve the performance and stability of the application, help the application maintain performance under a variety of different conditions, reduce application downtime, reduce application recovery time after a crash, enable the application to replicate its pre-crash performance, and the like).

The test workflows generated by the testing service may be used to test application code against failure scenarios and turbulent conditions that are common in production environments. For example, the test workflows may perform actions that test application code against network failures, storage failures, usage spikes, human errors, hardware limitations, third party outages, and the like. The workflow constructor may customize and or combine the steps included in test workflows to implement experiments that more accurately replicate production conditions. For example, the testing engine may construct test workflows that target specific portions of application code and include steps that affect multiple application code components and or multiple infrastructure components. By orchestrating interactions between multiple components of application code and component resources, the test workflows enable the identification of granular and complex limitations within application code instead of simply testing the entire application build to identify high level problems. The test workflows generated by the testing engine can also test the application code against a large number of different failure scenarios and turbulent conditions.

The testing service may be used to increase the availability, reliability, and resiliency of application code. For example, the testing service can identify limitations in application code that cause the application to be available only 99.99% of the time and have 6 hours of down time annually. Resiliency patterns built by the performance analysis service to address the limitations identified by the testing service can increase the application availability to 99.999% of the time and reduce the annual application down time to 6 minutes. The testing service can also test application code against common failure scenarios that cause 51% to 96% of all application failures. The limitations identified by the testing service during these tests may be corrected to avoid up to 96% of all application failures. The resiliency patterns generated by the performance analysis service may also increase resiliency of the application code and reduce recovery time after application crashes. For example, resiliency patterns that resolve the limitations identified by the testing service may reduce average recovery time of applications by more 30% from 30 minutes to 20 minutes. By reducing the average application recovery time and increasing application availability and reliability, the testing service reduces the operating costs required to maintain applications and improves user satisfaction.

Figure 5:
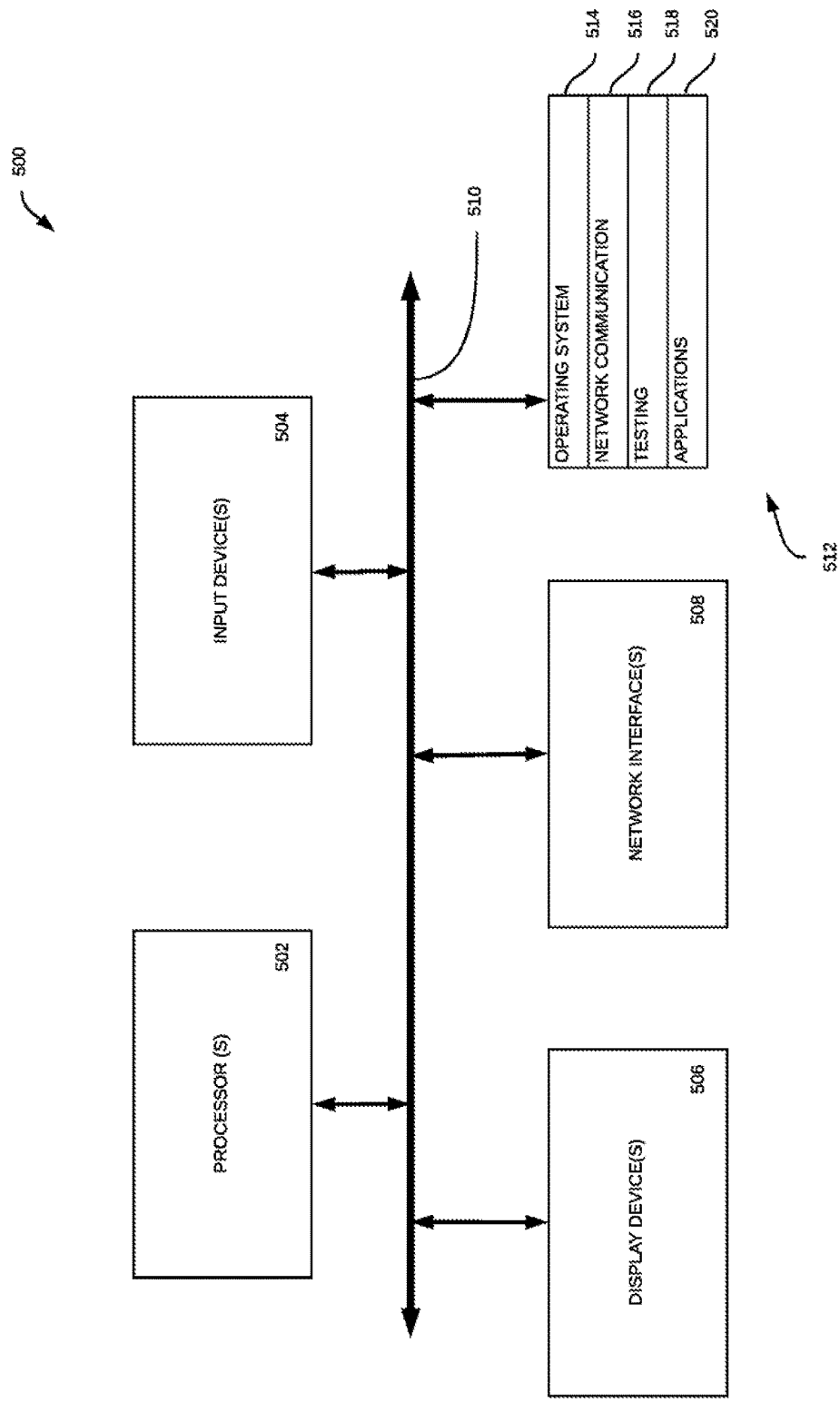
FIG. 5 is a block diagram illustrating an example computing device according to an embodiment of the present disclosure.

FIG. 5 shows an example computing device according to an embodiment of the present disclosure. For example, computing device 500 may function as client device 150, first server 120, second server 130, third server 160. The computing device 500 may include a testing service that tests the performance of application code under various conditions and failure scenarios. The computing device 500 may be implemented on any electronic device that runs software applications derived from compiled instructions, including without limitation personal computers, servers, smart phones, media players, electronic tablets, game consoles, email devices, etc. In some implementations, the computing device 500 may include one or more processors 502, one or more input devices 504, one or more display devices 506, one or more network interfaces 508, and one or more computer-readable mediums 512. Each of these components may be coupled by bus 510, and in some embodiments, these components may be distributed among multiple physical locations and coupled by a network.

Display device 506 may be any known display technology, including but not limited to display devices using Liquid Crystal Display (LCD) or Light Emitting Diode (LED) technology. Processor(s) 502 may use any known processor technology, including but not limited to graphics processors and multi-core processors. Input device 504 may be any known input device technology, including but not limited to a keyboard (including a virtual keyboard), mouse, track ball, camera, and touch-sensitive pad or display. Bus 510 may be any known internal or external bus technology, including but not limited to ISA, EISA, PCI, PCI Express, USB, Serial ATA or FireWire. Computer-readable medium 512 may be any non-transitory medium that participates in providing instructions to processor(s) 502 for execution, including without limitation, non-volatile storage media (e.g., optical disks, magnetic disks, flash drives, etc.), or volatile media (e.g., SDRAM, ROM, etc.).

Computer-readable medium 512 may include various instructions 514 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 504; sending output to display device 506; keeping track of files and directories on computer-readable medium 512; controlling peripheral devices (e.g., disk drives, printers, etc.) which can be controlled directly or through an I/O controller; and managing traffic on bus 510. Network communications instructions 516 may establish and maintain network connections (e.g., software for implementing communication protocols, such as TCP/IP, HTTP, Ethernet, telephony, etc.).

Testing instructions 518 may include instructions that enable computing device 500 to function as a testing service and/or to test application components and infrastructure components included in application code as described herein. Application(s) 520 may be an application that uses or implements the processes described herein and/or other processes. The processes may also be implemented in operating system 514. For example, application 520 and/or operating system may create tasks in applications as described herein.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112 (f). Claims that do not expressly include the phrase "means for" or "step for" are not to be interpreted under 35 U.S.C. 112 (f).

What is claimed is:

1. A computer implemented method, comprising:
   for an application code to be tested, building a testing environment including an application namespace and a test namespace, the application namespace including a first set of resources hosting the application code and the test namespace including a second set of resources hosting a test workflow with virtual compute instances accessible using a same name as the application code, the application namespace further including multiple component resources that are accessed by multiple application components of the application code and multiple infrastructure components of the application code during execution of the application code;
   automatically executing, in response to receiving a webhook, the test workflow against the application code by performing a series of actions, at least one action in the series of actions performing a chaos testing of at least one of the multiple application components or the multiple infrastructure components;
   identifying, based on executing the test workflow, limitations related to interactions between multiple components of the application code;
   building, based on performance data generated during the execution of test workflow, resiliency patterns configured to address the limitations; and
   incorporating implementations of the resiliency patterns to the application code.

2. The method of claim 1, further comprising:
   deploying the application code to the first set of resources in a computing environment; and
   deploying the test workflow to the second set of resources in the computing environment, the test workflow including the series of actions that test the application code against a failure scenario.

3. The method of claim 1, further comprising:
   receiving the performance data in response to the at least one action from the first set of resources.

4. The method of claim 3, further comprising:
   determining a performance of the application code during a failure scenario based on the performance data.

5. The method of claim 3, the performance data including at least one of a crash, an error, a recovery time, or an application downtime generated by the application code in response to the at least one action affecting at least one of the multiple application components and or infrastructure components of the application code.

6. The method of claim 1, further comprising:
   modifying at least one of the multiple component resources based on the test workflow to affect the at least one of the multiple application components or the multiple infrastructure components included in the application code.

7. The method of claim 1, further comprising:
generating a system response report including the performance data for each action included in the series of actions; and
analyzing the system response report to identify the limitations of the application code.

8. The method of claim 7, further comprising:
developing the resiliency patterns for a failure scenario based on the limitations; and
implementing the resiliency patterns in the application code to improve performance of the application code during the failure scenario.

9. The method of claim 1, the series of actions in the test workflow being implemented in test source code and the method further comprises:
selecting the series of actions from a testing source code repository that includes multiple tests, each test being included in the multiple tests provides a particular failure scenario that targets at least one of the multiple application components or the multiple infrastructure components of the application code.

10. The method of claim 1, further comprising:
testing services in a computing environment by periodically executing the test workflow based on a predefined schedule.

11. A system comprising:
a non-transitory storage medium storing computer program instructions; and
a processor configured to execute the computer program instructions to cause operations comprising:
for an application code to be tested, building a testing environment including an application namespace and a test namespace, the application namespace including a first set of resources hosting the application code and the test namespace including a second set of resources hosting a test workflow with virtual compute instances accessible using a same name as the application code, the application namespace further including multiple component resources that are accessed by multiple application components of the application code and multiple infrastructure components of the application code during execution of the application code;
automatically executing, in response to receiving a webhook, the test workflow against the application code by performing a series of actions, at least one action in the series of actions performing a chaos testing of at least one of the multiple application components or the multiple infrastructure components;
identifying, based on executing the test workflow, limitations related to interactions between multiple components of the application code;
building, based on performance data generated during the execution of test workflow, resiliency patterns configured to address the limitations; and
incorporating implementations of the resiliency patterns to the application code.

12. The system of claim 11, the operations further comprising:
deploying the application code to the first set of resources in a computing environment; and
deploying the test workflow to the second set of resources in the computing environment, the test workflow including the series of actions that test the application code against a failure scenario.

13. The system of claim 11, the operations further comprising:
receiving the performance data in response to the at least one action from the first set of resources.

14. The system of claim 13, the operations further comprising:
determining a performance of the application code during a failure scenario based on the performance data.

15. The system of claim 13, the performance data including at least one of a crash, an error, a recovery time, or an application downtime generated by the application code in response to the at least one action affecting at least one of the multiple application components and or infrastructure components of the application code.

16. The system of claim 11, the operations further comprising:
modifying at least one of the multiple component resources based on the test workflow to affect the at least one of the multiple application components or the multiple infrastructure components included in the application code.

17. The system of claim 11, the operations further comprising:
generating a system response report including the performance data for each action included in the series of actions; and
analyzing the system response report to identify the limitations of the application code.

18. The system of claim 17, the operations further comprising:
developing the resiliency patterns for a failure scenario based on the limitations; and
implementing the resiliency patterns in the application code to improve performance of the application code during the failure scenario.

19. The system of claim 11, the series of actions in the test workflow being implemented in test source code and the operations further comprising:
selecting the series of actions from a testing source code repository that includes multiple tests, each test being included in the multiple tests provides a particular failure scenario that targets at least one of the multiple application components or the multiple infrastructure components of the application code.

20. The system of claim 11, the operations further comprising:
testing services in a computing environment by periodically executing the test workflow based on a predefined schedule.

* * * * *